(12) United States Patent
Le

(10) Patent No.: US 6,496,485 B1
(45) Date of Patent: Dec. 17, 2002

(54) METHOD OF LOOP BREAKING TREE INDENTIFICATION IN A SYSTEM BUS HIERARCY

(75) Inventor: Thang Vinh Le, Rocklin, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/332,796

(22) Filed: Jun. 14, 1999

(51) Int. Cl.$^7$ .............................................. H04L 12/413
(52) U.S. Cl. ...................... 370/257; 370/447; 370/461; 370/462
(58) Field of Search ................... 370/257, 389, 370/255, 447, 461, 462; 709/226, 229, 221, 222, 248; 710/40–41, 43, 104–106, 119–123, 242–244

(56) References Cited

U.S. PATENT DOCUMENTS 4,516,205 A * 5/1985 Eing et al. .................. 709/248
5,784,557 A * 7/1998 Oprescu ..................... 709/220
5,892,769 A * 4/1999 Lee ............................ 370/447

* cited by examiner

*Primary Examiner*—Salvatore Cangialosi

(57) ABSTRACT

An improved method for identifying a bus topology, even when the bus contains one or more loops between nodes. The invention allows the tree identification process to be resolved within a known maximum amount of time. The method uses a superset of a globally unique ID as part of the tree identification process. After a bus reset, nodes repeat a highest priority number constructed from the GUID. At the end of a fixed time, all nodes become stable and their ports are sending either their own priority number which is the highest priority number on the bus, repeating such number, or sending a submission marker. The submission marker is a signal condition or a packet of information that indicates that a port is a child with respect to a sending port. A node becomes a root node if it is sending a priority number that matches its own priority number. Nodes with ports that neither send nor receive a submission marker, mark such ports as "loop branches" and disable them from the bus topology.

13 Claims, 4 Drawing Sheets

METHOD OF LOOP BREAKING TREE INDENTIFICATION IN A SYSTEM BUS HIERARCY

The present invention generally relates to communication busses, and more particularly relates to a method for breaking loops during a tree identification process of a system bus.

Bus interconnects allow a wide range of devices, for example computers and peripherals, to share a same media. Communication between attached devices which share the same media can be problematic, however, due to known bus protocols which require a node to arbitrate for control of the bus before transmitting data. Some existing bus architectures provide protocols that define an arbitration process for a bus topology which is tree-like. In such a tree-like topology, a hierarchy of nodes must be specified to accommodate the arbitration process.

To achieve a high speed bus, IEEE 1394 Standards utilize a tree-identification (ID) process using an algorithm that quickly locates peripheral devices connected on the bus. The tree-ID process establishes a hierarchy of nodes, including a root node to accommodate arbitration. The root node is the highest node in the hierarchy. To maintain the hierarchy, the tree-ID process occurs whenever a new device is added to the bus or turned on.

A problem exists with tree-like topologies similar to IEEE 1394 Standards since, by definition, they only work when there is no loop of devices on the bus. A loop occurs whenever more than one path connects any two nodes. According to the Standard, a looped topology will hang the bus during the tree-ID process, thus not all of the nodes can proceed with the tree-ID process. When a looped topology exists, no node will become the root node, and in the absence of a root node, no requests for arbitration will be granted. Unfortunately, nodes are often connected in a loop, even if inadvertently.

Accordingly, in response to the problems discussed above, a primary object of the present invention is to provide an improved method of determining system bus hierarchy.

Another object of the present invention is to provide an improved method that handles looped topologies within a maximum predetermined time period.

Other objects and advantages will become apparent upon reading the following detailed description, in conjunction with the attached drawings, in which.

TABLE OF ACRONYMS

This patent utilizes several acronyms and abbreviations. The following table is provided to aid the reader in determining the meaning of the several acronyms and abbreviations:

GUID=Globally unique identification.
HPN=Highest priority number.
ID=Identification.
Next_tx(Port x)=Value to be transferred next by Port x.
OPN=Own priority number.
Rx=Receive.
Rx_PN=Receive priority number.
Tx=Transfer.

DETAILED DESCRIPTION

Broadly stated, the present invention is directed to an improved method for identifying a bus topology, even when the bus contains one or more loops between nodes. It should be appreciated that the method of the present invention works for any bus topology, including one that is star-like only, e.g., 10T/100T hub wiring, serial only, e.g., token ring, and any mix of the two, e.g., IEEE Standard 1394. In addition, the method functions when bits are sent and received one bit at a time, i.e., serially, and when multiple bits are sent in parallel.

The invention allows the identification process to be resolved within a known maximum amount of time. The method uses a nodes willingness to become a root node and a superset of a globally unique identification (GUID) to create a priority number as part of the identification process. After a bus reset, nodes send and repeat a priority number. For the purpose of describing the invention, the method is performed in terms of a highest priority number, however, it should be appreciated that the invention also works in terms of a lowest priority number with only minor adjustments to the method, i.e., a lowest priority number would win.

At the end of a fixed time, all nodes become stable and the ports are sending either their own priority number which is the highest priority number on the bus, repeating such number, or sending a submission marker. The submission marker is a signal condition or a packet of information that indicates that a port is a child with respect to a sending port. The node with a matching priority number becomes a root node, i.e., the highest node in the topology. Nodes with ports that are neither sending nor receiving a submission marker, mark such ports as "loop branches" and disable them from the bus topology.

Figure 1:
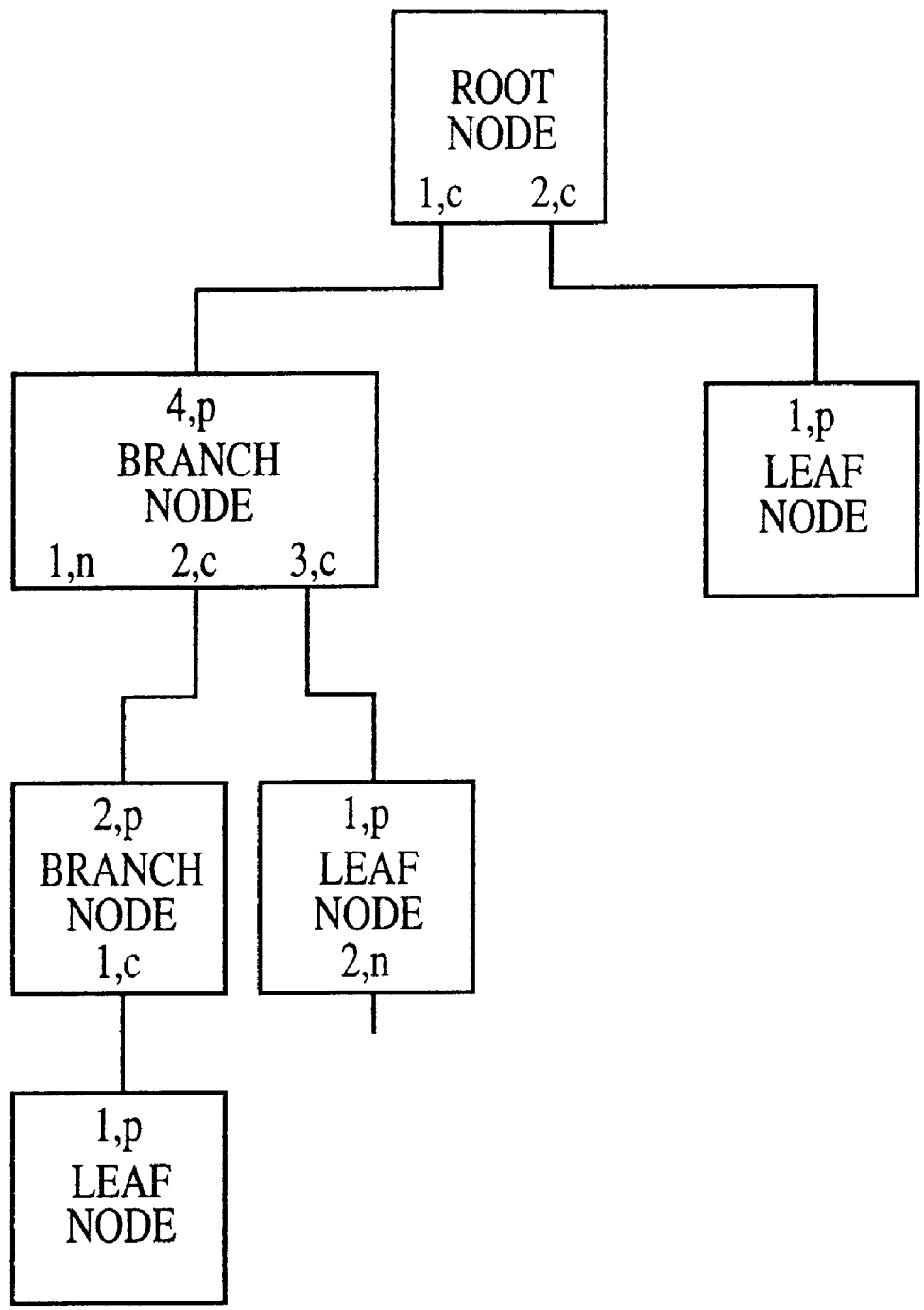
FIG. 1 is a known bus hierarchy according to IEEE 1394 Standards.

Turning now to the drawings, and particularly FIG. 1, a conventional IEEE 1394 tree-ID process identifies nodes as parents and children. After a bus reset, a tree-ID process occurs with one or more nodes signaling to notify their potential parents. Branch nodes (those having two or more ports) mark a port as a child (c) to signify that the attached node is further away from a root node. Leaf nodes (those having only one port) mark its port as a parent (p) to signify that the attached node is closer to the root node. The root node is a node that has no parent and thus owns responsibility of arbitration control. Once all nodes have identified all other attached nodes as either children or parents, the conventional tree-ID process is complete.

Figure 2:
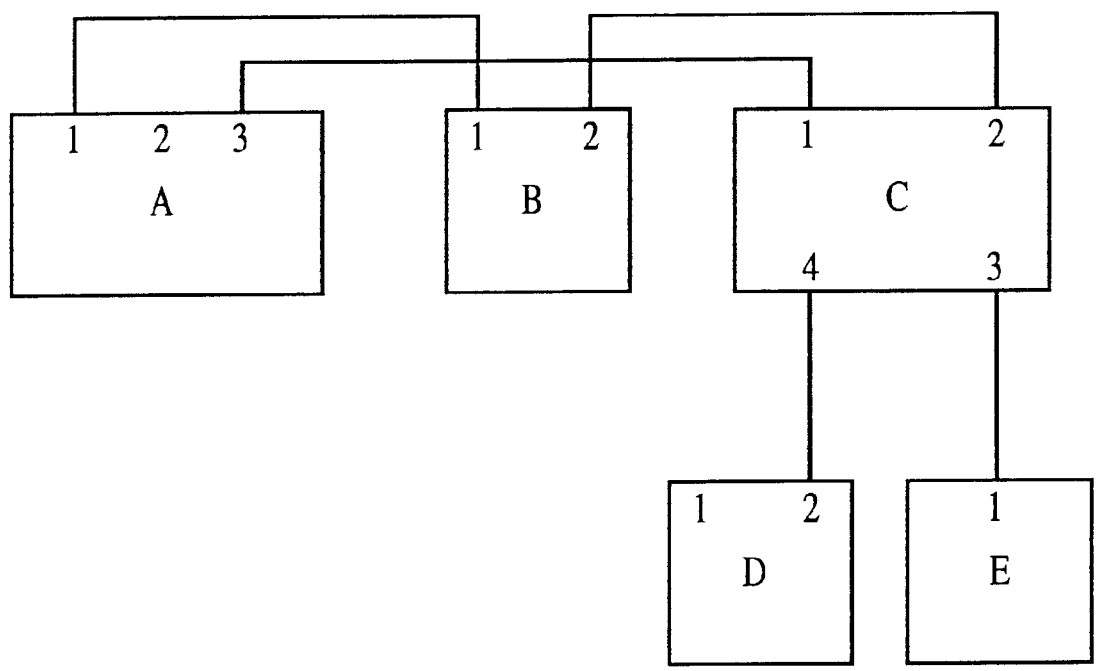
FIG. 2 is a known example of a bus configuration having loops.

The conventional tree-ID does not function properly, however, when a loop exists in the bus configuration. FIG. 2 shows an exemplary situation in which a loop occurs between nodes. As shown, the tree-ID process has proceeded as far as it can and leaf nodes D and E have completed their parent/child handshake. None of the remaining nodes A, B, or C, however, can complete the tree ID process since all but one of the ports have been identified. Thus, nodes A, B, and C hang in the state shown, with each node presuming that the tree-ID process is complete. In actuality, however, the process is not complete because a root node cannot be identified. Thus, an arbitration process cannot be performed.

Figure 3:
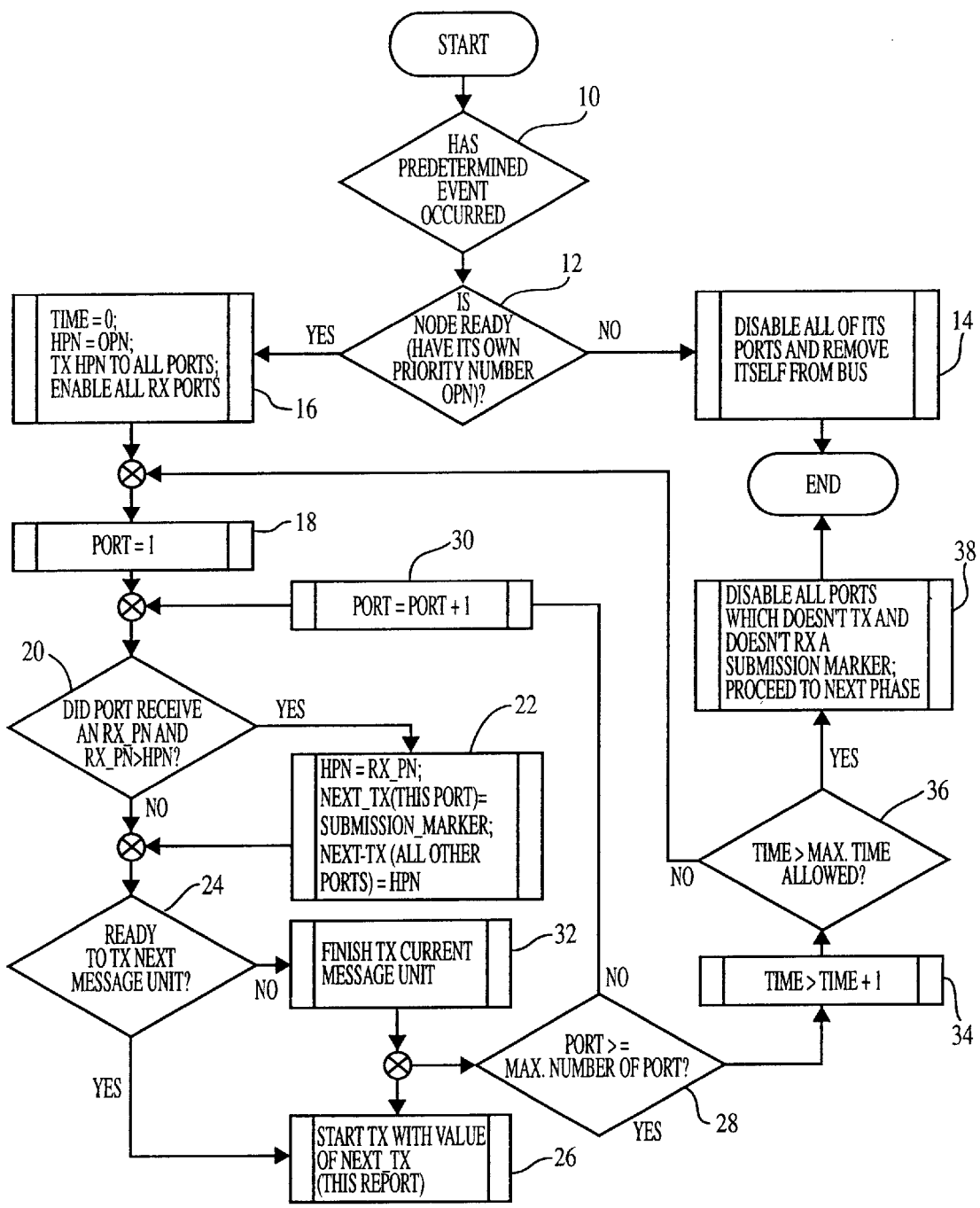
FIG. 3,is a flow chart of the method for carrying out the present invention.

Turning now to FIG. 3, the present method begins after a predetermined event occurs, for example, after a bus reset (block 10). Typically a bus reset ensues after the bus is brought up, i.e., nodes on the bus are powered up or one or more nodes are added to the bus. The method of the present invention takes place as the bus is brought up and takes the place of a conventional tree-Id process used by standards such as IEEE 1394.

In a preferred embodiment, after a bus reset occurs a priority number is constructed for nodes on the bus using one or more root contention fields that indicate the nodes' desire to become a parent, and using a globally unique ID (GUID). Either fixed or programmable fields are used to indicate the willingness of a node to become a root node, i.e., a node with no parent. To construct the priority number, one or more root contention fields are placed at the most significant end of the priority number. To avoid preference for a certain vendor's product, the GUID preferably is separated into two or more fields such that when the fields are swapped and substituted to the form part of the priority number, the manufacturer number field is not the dominant part of the priority number.

After constructing the priority numbers for each node, each node determines whether it possesses a priority number (OPN) (block 12). If a priority number is not available for a node, a signal is sent to all of its ports to indicate the node's non-ready status and disable the node for purposes of the tree identification (block 14). A node exists in a non-ready status, for example, if the node is powered on but is missing information, e.g., a floppy disk containing an identification information is not available to the node. In addition, a node may be powered down when the bus is brought up, e.g., the node is on a fax machine that shuts off after a certain time has elapsed to conserve power. Thus, the non-ready status of the node without a priority number is propagated to the other nodes on the bus to inform the other nodes that it cannot participate due to its state. This allows the bus to wake up with the knowledge that part of the bus is inactive.

If a priority number is available for a node, however, the node enters the tree identification method of the invention. A timer is set, to zero for example, and the highest priority number (HPN) for a particular node set to its own priority number OPN (block 16). The nodes transfer the highest priority number HPN to all of their respective ports by using a decision table or a map, for example (block 16). The decision table is accessible by the ports on a node to determine a next value to transfer (Next_tx(Port x)) when it is their time to transfer. To prepare for the receipt of values, the nodes also enable their receive ports (block 16).

For the sake of simplifying an explanation of the invention, the remainder of the method is explained with reference to a single node and to a specific port. It can be appreciated, however, that other nodes on the bus simultaneously experience the same method. In addition, while the method of the present invention is explained in a serial manner with respect to ports, artisans will appreciate that during the method all ports on all nodes are being considered in parallel, for example, with a state machine.

The method continues, for example at Port one, of a particular node (block 18). Port one receives a received value priority number (Rx_PN) from a sending node, and determines whether the received priority number Rx_PN is greater than the highest priority number HPN currently mapped for that node (block 20). If the received priority number Rx_PN is greater than the highest priority number HPN, the node updates the decision table so that the highest priority number HPN equals the received priority number Rx_PN (block 22). In addition, the node updates the decision table by setting the next transfer for Port one to a submission marker that indicates Port one is a child Port with respect to that sending port. Artisans will appreciate that such submission marker can be a signal condition or a packet of information. In a preferred embodiment, a priority number of zero is sent as a submission marker to the source of the higher number. Additionally, the decision table is updated to indicate that the next transfer for other ports on the node is set to the highest priority number HPN.

Next it is determined whether Port one is ready to transfer the next message unit (block 24). The next message is not sent until the previous message unit is completely sent, to not disrupt the previous message unit. It will be,appreciated that the step of deciding to transfer the next message (block 24) and the step of deciding whether the received priority number Rx_PN is greater than the highest priority number HPN (block 20) are not required to occur in any particular order, and in a preferred embodiment, occur simultaneously.

If Port one is ready to transfer the next message unit, Port one transfers the next value for Port one to transfer, namely Next_tx(Port 1) according to the decision table (block 26). Currently, in this example, the value of Next_tx(Port 1) is a submission marker. Thereafter, it is determined whether the current port is the maximum number port on the node (block 28). If, for example, there are two ports on the node, Port one is not the maximum number port on the node. Therefore, the port number is incremented, to Port 2 for example (block 30).

Thereafter, it is determined whether Port two has received a priority number, and if it has, whether the received priority number Rx_PN is greater than the highest priority number HPN currently located in the decision table (block 20). It can be appreciated that the value for the highest priority number HPN is currently the value that was received on Port one in first pass through the present method. For exemplary purposes, the received priority number value Rx_PN as received by Port two is not greater than the highest priority number HPN located in the decision table. Thus, the decision table is not updated and it is decided whether Port two is ready to transfer the next message (block 24). If Port two is not ready to transfer the next message unit, Port two continues to transfer its current message unit (block 32).

Next it is determined whether Port two is the maximum number port (block 28). Is this example, Port two is the maximum number port, thus the timer is incremented (block 34), and it is determined whether the incremented time equals the maximum allowable time as specified by an operator, for example (block 36). The tree identification period ends after a fixed maximum amount of time expires equal to the sum of all worst case travel delays, i.e., the longest time it takes for the priority number signals to propagate through all of the nodes in a linear manner. Artisans will appreciate that the upper time limit takes into account medium and topology delays, logic decision making times, and a margin of error time. Thus, when the tree identification period ends, an equilibrium is reached over the entire bus.

If the maximum allowable time has not elapsed, the port number is reset, for example, to the first port, Port one. Again Port one determines whether it has received a priority number Rx_PN greater than the highest priority number (block 20). If Port one has received a higher priority number, the node resets the decision table so that the highest priority number HPN equals the received priority number Rx_PN. In addition, the next transfer for port one is a submission marker and the next transfer for the other ports, e.g., Port two, is the highest priority number HPN. Thus, when Port two is ready to transfer the next message unit (block 24), the value transferred is Next_tx(Port 2), i.e., Port 2 repeats the highest priority number HPN.

The process continues until the maximum time allowed has expired and the cycle is on the maximum number port (block 28, 34, and 36). Artisans will appreciate that the above described process occurs for all participating nodes on the bus. When the time expires, a port is sending either its own priority number which is the highest priority number on the bus, is repeating such number, or is sending a submission marker. After the set time expires, each node disables all of its ports that did not send or receive a submission marker (block 38).

Figure 4A:
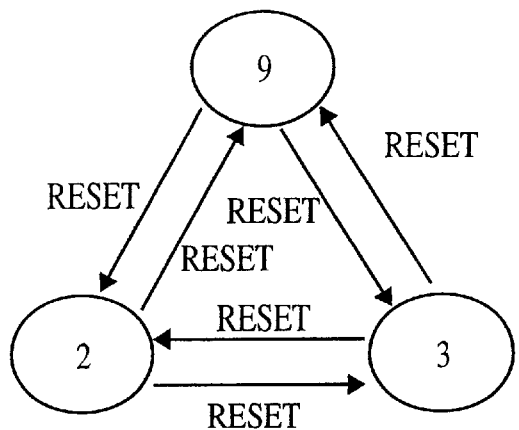
FIGS. 4A–4D show exemplary tree identification using the method of the present invention.
Figure 4B:
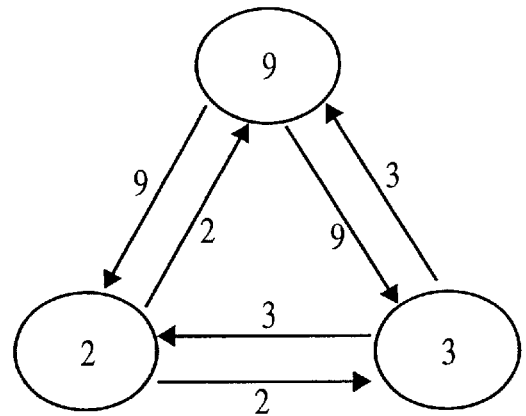
Figure 4C:
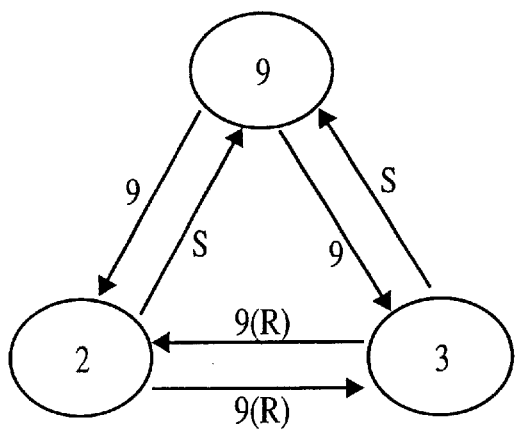

FIGS. 4A–4D shows that the present method breaks any loop forming branches, if they are present. For example, three nodes have priority numbers of nine, two, and three, respectively, and each node has two ports. FIG. 4A shows a bus reset condition on the bus which signals the beginning of the present method. FIG. 4B shows the nodes transferring and receiving priority numbers on their ports. FIG. 4C displays the nodes with priority number two and three send a submission marker to the node with priority number nine, since nine is a greater priority number than two or three.

When the node with priority number two receives the priority number nine from the node with priority number three, the priority number nine received on that port is not greater than the priority nine received on its other port, thus no submission marker is sent. In addition, when the node with priority number three receives the priority number nine from the node with priority number two, the priority number nine received on that port is not greater than the priority nine received on its other port, thus no submission marker is sent. In case the of duplicated, equal, and identical priority numbers, the first number obtained is treated as the received priority number. If a node receives two identical priority numbers from two ports at the same time, the node arbitrarily decides from which port it has received the priority number, for example, based on a physical priority of the port.

Figure 4D:
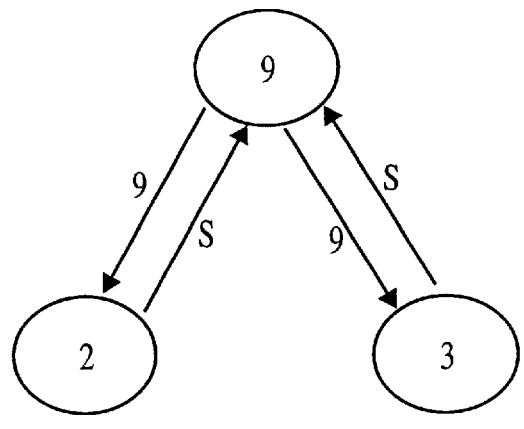

FIG. 4D shows that upon exiting the tree identification period the ports that neither sent nor received a submission mark are disabled. In addition, the node sending priority number nine is the root node since it sent its own priority number upon exiting the tree identification period.

Referring again to FIG. 3, once the tree structure is identified, a next phase can begin (block 38). A conventional self-ID process can occur, for example, according to the IEEE 1394 Standards. IEEE 1394 specifies that during self-ID process all nodes are assigned addresses and specify their capabilities by broadcasting self-ID packets. In addition, the topology, for example as defined during tree identification method of the invention, is broadcast during the self-ID process.

From the foregoing description, it should be understood that an improved bus tree identification method has been shown and described which has many desirable attributes and advantages. The present method operates a tree identification method that breaks loops and is able to determine a hierarchy for a bus having a tree-like topology. In addition, the present method operates within a known maximum amount of time and without violating known standards, such as IEEE 1394.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method for determining a hierarchy of nodes on a tree-like topology bus, the method comprising the steps of:

each node sending an individual priority number from each of its ports to attached ports of other nodes, wherein the number of said individual priority numbers generally correspond to the number of nodes on the bus;

at the end of a predetermined time interval, said ports having sent either their own priority number which is a highest priority number on the bus, the highest priority number received from another port, or a submission marker if the priority number received from another port is higher than their own priority number; and disabling ports of nodes that have not sent or received said submission marker to remove loops from the bus topology.

2. The method according to claim 1 wherein said priority number is determined based on a willingness of the node to become a root node.

3. The method according to claim 2 wherein a willingness to become a root node is determined by root contention fields.

4. The method according to claim 3 wherein said priority number is constructed from said root contention fields and a globally unique identification.

5. The method according to claim 2 wherein a root node is a node that has sent its own priority number at the end of said predetermined time interval.

6. The method according to claim 1 wherein said predetermined time interval ends at least equals the longest time it takes for all of said priority number signals to propagate through all of the nodes in a linear manner.

7. The method according to claim 1 wherein nodes are disabled that do not send a priority number.

8. A method for determining a hierarchy of nodes on a tree-like topology bus, the method comprising the steps of:

a) each node sending a node priority number from each of its ports to attached ports of other nodes on the bus;

b) said attached ports receiving said node priority number and comparing said node priority number with a local number to determine whether said node priority number is greater than said local number;

c) sending a submission marker to said attached port if said node priority number is greater than said local number and updating said local number to equal said node priority number, otherwise sending the greater of said local number or said node priority number as said node priority number to said attached ports; and d) repeating steps (b) and (c) until a predetermined time interval expires, and thereafter breaking connections with said ports that have not sent or received a submission marker.

9. The method according to claim 8 wherein said step of sending said node priority numbers begins after a predetermined event occurs.

10. The method according to claim 9 wherein said predetermined event is a bus reset.

11. The method according to claim 8 where said node priority number is assembled using one or more fields that indicate a node's desire to become a parent.

12. The method according to claim 11 wherein nodes are disabled that do not contain a node priority number.

13. The method according to claim 8 wherein said predetermined time interval ends after a period equal to or greater than the longest time it takes for all of said priority number signals to propagate through all of the nodes in a linear manner.

\* \* \* \* \*